United States Patent
Nagae (10) Patent No.: US 7,448,811 B2
(45) Date of Patent: Nov. 11, 2008

(54) LENS BARREL AND IMAGING APPARATUS HAVING THE SAME

(75) Inventor: Ryuichi Nagae, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 484 days.

(21) Appl. No.: 11/219,243

(22) Filed: Sep. 2, 2005

(65) Prior Publication Data
US 2006/0067671 A1   Mar. 30, 2006

(30) Foreign Application Priority Data
Sep. 29, 2004   (JP)   ............ 2004-284346

(51) Int. Cl.
*G03B 5/02*   (2006.01)
(52) U.S. Cl. .......... 396/348; 396/349; 396/529; 359/819; 359/362; 359/699
(58) Field of Classification Search ......... 396/348–349, 396/529; 348/45, 208.11; 381/342; 359/694–706, 359/819–826; *G03B 17/04, 17/02*
See application file for complete search history.

(56) References Cited

U.S. PATENT DOCUMENTS

| 5,209,570 | A | * | 5/1993 | Neuhaus ............. 374/131 |
| 5,561,487 | A | * | 10/1996 | Kanno ............. 396/529 |
| 5,592,335 | A | * | 1/1997 | Omi et al. ............. 359/695 |
| 5,612,826 | A | | 3/1997 | Ohshita |
| 6,091,900 | A | * | 7/2000 | Kaneda et al. ............. 396/55 |
| 6,339,681 | B1 | * | 1/2002 | Takeshita ............. 396/79 |
| 7,236,312 | B2 | * | 6/2007 | Yasui et al. ............. 359/699 |
| 7,286,307 | B2 | * | 10/2007 | Yamamoto et al. ............. 359/819 |
| 7,309,176 | B2 | * | 12/2007 | Shirakata et al. ............. 396/349 |
| 2003/0090579 | A1 | * | 5/2003 | Ohe et al. ............. 348/240.3 |
| 2003/0156832 | A1 | | 8/2003 | Nomura |
| 2004/0080655 | A1 | | 4/2004 | Watanabe |
| 2005/0036777 | A1 | | 2/2005 | Nomura |

FOREIGN PATENT DOCUMENTS

| JP | 2003-315861 A | 11/2003 |
| JP | 2004-053633 A | 2/2004 |
| JP | 2004-145029 A | 5/2004 |

* cited by examiner

*Primary Examiner*—W. B. Perkey
*Assistant Examiner*—Linda B Smith
(74) *Attorney, Agent, or Firm*—Canon U.S.A. Inc., I.P. Division

(57) ABSTRACT

At least one exemplary embodiment is directed to a lens barrel, which includes a photographic lens including a plurality of lens units, at least one lens surface of the photographic lens facing an imaging plane being a concave surface, and an optical diaphragm. The optical diaphragm is at least partly stowable in a space defined by the concave surface.

11 Claims, 8 Drawing Sheets

LENS BARREL AND IMAGING APPARATUS HAVING THE SAME

CROSS REFERENCE TO RELATED APPLICATIONS

This application claims priority from Japanese Patent Application No. 2004-284346 filed Sep. 29, 2004, which is hereby incorporated by reference herein in its entirety.

BACKGROUND OF THE INVENTION

1. Field of the Invention

The present invention relates to a lens barrel and more particularly, although not exclusively a lens barrel used in an imaging apparatus.

2. Description of the Related Art

Film cameras using silver-halide film and digital cameras capable of photographing with an image sensor have been conventionally well-known and widely used. In recent years, for the purpose of improving portability of a camera, the technical development of an internal mechanism of the camera has been performed in order to miniaturize the camera and to increase a rate of change of a focal length (zoom magnification), and, thus, various techniques have been proposed.

Conventional cameras include a zoom camera capable of changing the focal length of a photographic lens, and a monofocal camera having a fixed focal length lens. In these cameras, a lens barrel is generally provided which can extend and retract a photographic lens for the purpose of miniaturizing the camera at the non-photographing time (when the power source of the camera is turned off) or changing the focal length of the camera at the photographing time (when the power source of the camera is turned on).

In recent years, various mechanisms concentrating on slimming a camera have been proposed for realizing the simple portability of the camera. For slimming a camera, it is important to slim not only a battery or a liquid crystal display but also a lens barrel. For slimming a lens barrel, it is important to slim not only a photographic lens but also an internal mechanism of the camera, such as a shutter mechanism, a diaphragm mechanism, a focus adjusting mechanism, which are provided inside the lens barrel.

For example, a technique for sliming a lens barrel is discussed in Japanese Patent Application Laid-Open No. 2004-145029, in which a constituent member of the lens barrel is caused to recede from an optical axis to thereby reduce the depth of the lens barrel when the power source of the camera is turned off (when the lens barrel is in a retracted state)

Further, a similar construction as in the above technique is discussed in Japanese Patent Application Laid-Open No. 2003-315861, in which a photographic lens is caused to recede from an optical axis to thereby reduce the depth of the lens barrel when the lens barrel is in a retracted state.

Furthermore, a technique for miniaturizing a photographic lens is discussed in Japanese Patent Application Laid-Open No. 2004-053633, in which the positions of a diaphragm mechanism and a shutter mechanism are changed from a conventional arrangement to thereby reduce the depth of a lens barrel when the lens barrel is in a retracted state.

However, the techniques discussed in Japanese Patent Applications Laid-Open No. 2004-145029 and 2003-315861 may result in a cost increase, because an additional mechanism is needed to cause a member provided at the photographic lens to recede from the optical axis. Such a member is an infrared cut filter in Japanese Patent Application Laid-Open No. 2004-145029 or a photographic lens in Japanese Patent Application Laid-Open No. 2003-315861. Further, in the technique discussed in Japanese Patent Application Laid-Open No. 2003-315861, the photographic lens recedes from the optical axis to thereby reduce the depth of the lens barrel when the lens barrel is in a retracted state. However, a space for storing the receding photographic lens is needed, thus resulting in an increase in the diameter of the lens barrel. As the lens barrel is increased in size, the entire camera becomes large.

Further, in the technique discussed in Japanese Patent Application Laid-Open No. 2004-053633, the positions of the diaphragm mechanism and the shutter mechanism are changed from a conventional arrangement to thereby reduce the depth of the lens barrel when the lens barrel is in a retracted state. In this technique, the construction of an optical photographic lens is discussed, and the positions of the diaphragm mechanism and the shutter mechanism are also discussed. However, the construction of the photographic lens and the positions of the diaphragm mechanism and the shutter mechanism does not address completely the reduction of the depth of the lens barrel when the lens barrel is in a retracted state.

SUMMARY OF THE INVENTION

At least one exemplary embodiment is directed to reduce the depth (length) of a lens barrel in an optical axis direction.

In a further exemplary embodiment, a lens barrel includes a photographic lens including a plurality of lens units, at least one lens surface of the photographic lens faces an imaging plane being a concave surface, and an optical diaphragm. The optical diaphragm can be stowed in a space defined by the concave surface.

In at least one exemplary embodiment, the optical diaphragm is formed, in the lens barrel configured as described above, integrally with a member holding the photographic lens.

In at least one further exemplary embodiment, the member holding the photographic lens, in the lens barrel configured as described above, is stowable in a space defined by the concave surface.

In at least one further exemplary embodiment, a lens barrel includes a photographic lens including a plurality of lens units, and a plurality of optical diaphragms corresponding to the plurality of the lens units. At least one optical diaphragm is configured to enter an inner circumferential space of another optical diaphragm.

In at least one further exemplary embodiment, at least one of the plurality of optical diaphragms, in the lens barrel configured as described above, is formed integrally with a member holding the photographic lens.

In at least one further exemplary embodiment, a lens barrel includes a photographic lens including a plurality of lens units, at least one lens surface of the photographic lens facing an imaging plane being a concave surface, and an optical diaphragm. At least a part of a member holding the photographic lens is stowable in a space defined by the concave surface and the optical diaphragm.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate a few exemplary embodiments of the invention.

DETAILED DESCRIPTION OF THE EMBODIMENTS

The following description of exemplary embodiment(s) is merely illustrative in nature and is in no way intended to limit the invention, its application, or uses.

Exemplary embodiments can be operatively connected to various imaging devices (e.g., electronic cameras, camcorders, digital still cameras, film cameras, broadcast cameras, other imaging devices as known by one of ordinary skill, and equivalents) forming imaging systems.

Processes, techniques, apparatus, and materials as known by one of ordinary skill in the art may not be discussed in detail but are intended to be part of the enabling description where appropriate. For example, lens and lens units are discussed and any material that can be used to form lenses should fall within the scope of exemplary embodiments (e.g., glass, Si). Additionally the actual size of the lens may not be discussed, however, any size from macro lenses to nano lenses are intended to lie within the scope of exemplary embodiments (e.g., lenses with diameters of nanometer size, micro size, centimeter size, and meter sizes).

Additionally exemplary embodiments are not limited to visual imaging devices (e.g., optical photographic systems), for example, the system can be designed for use with infrared and other wavelength imaging systems. Additionally, exemplary embodiments can be used with non-digital systems as well as digital systems (e.g., photographic systems using CCDs).

Notice that similar reference numerals and letters refer to similar items in the following figures, and thus once an item is defined in one figure, it may not be discussed or further defined in the following figures.

Exemplary embodiments will be described in detail below with reference to the drawings.

Figure 1:
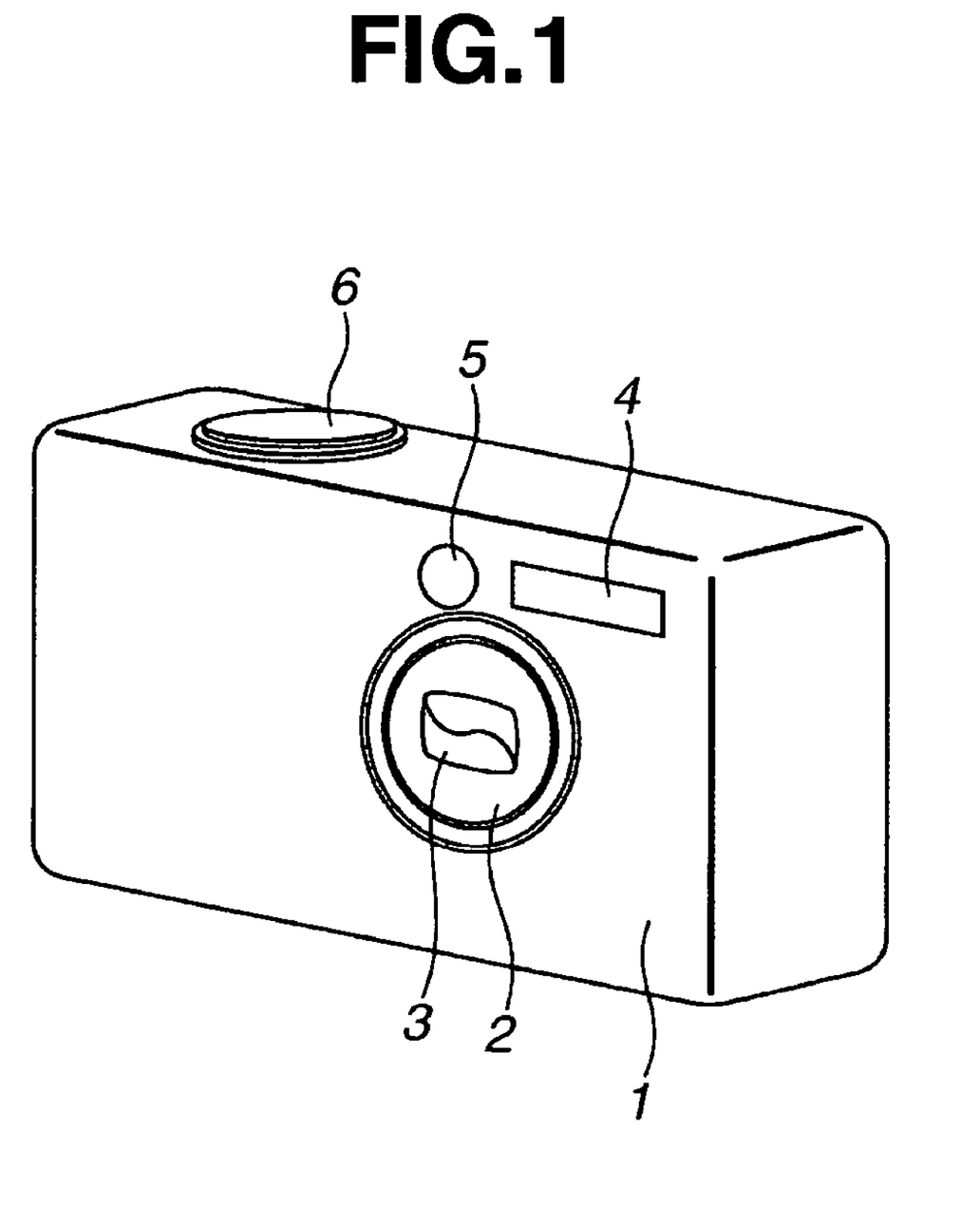
FIG. 1 illustrates an external view of a camera according to an exemplary embodiment.

FIG. 1 illustrates an external view of a camera according to at least one exemplary embodiment. The camera has a camera body 1. A front surface of the camera body 1 has a lens barrel 2, which is configured to be extendable and retractable, which can be used to change the focal length of a photographic lens. A front surface of the lens barrel 2 has a lens barrier device 3, which opens and closes an optical path of the photographic lens when the power source of the camera is turned on and off. Further, a light emission window 4 provided at the front surface of the camera body 1, passes emitted light (e.g., from a flash device) towards a photographic object. A finder window 5 is provided to the left side of the light emission window part 4 as viewed from the front of the camera body 1. Further, a release button 6 is provided at an upper surface of the camera body 1. The release button 6 can be used for initiating a photography preparing operation (e.g., a focus adjusting operation and a light metering operation) and a photographing operation (e.g., an exposure operation) for recording, using a film or an image sensor (e.g., a charge-coupled device (CCD) sensor, a complementary metal-oxide semiconductor (CMOS) sensor, other image sensors as known by one of ordinary skill in the relevant art and equivalents). Although FIG. 1 illustrates a typical schematic view of a camera in accordance with at least one exemplary embodiment, other exemplary embodiments are not limited to the particular arrangement of elements shown in FIG. 1.

Figure 2:
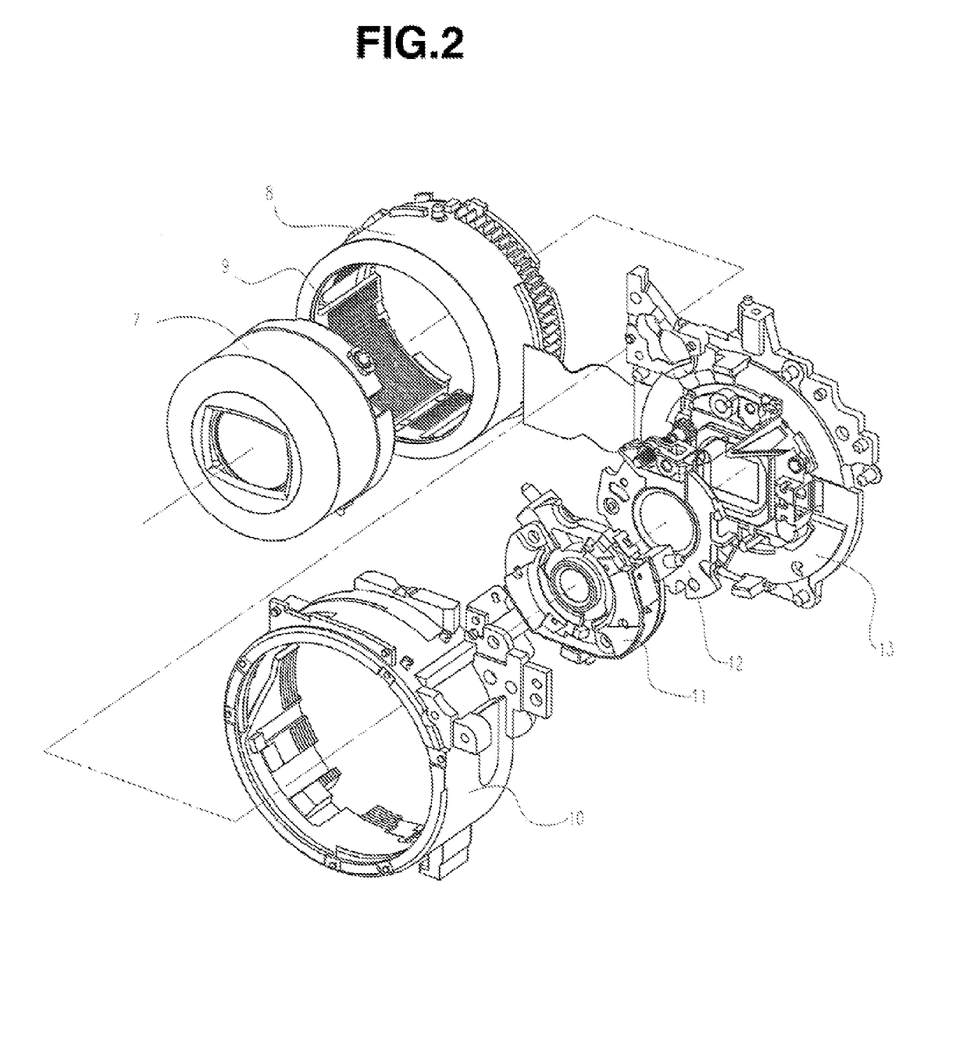
FIG. 2 illustrates an exploded perspective view of a lens barrel according to an exemplary embodiment.

FIG. 2 illustrates an exploded perspective view of the lens barrel 2. A first lens unit 7 holds a first photographic lens group and includes the lens barrier device 3. A moving cam ring 8 has a driving cam at an inner circumference part thereof. The driving cam of the moving cam ring 8 can be used to drive the first lens unit 7 and a second lens unit 11. The moving cam ring 8 has a gear part configured to receive power from a lens barrel driving motor (not shown). A rectilinear motion tube 9 is rotatably held by the moving cam ring 8 and is configured to control the rectilinear motion of the first lens unit 7 and the second lens unit 11. A stationary tube 10 has a driving cam at an inner circumference thereof. The driving cam of the stationary tube 1 0 is used to drive the moving cam ring 8. The second lens unit 11 holds a second photographic lens group and includes a shutter mechanism (not shown). A third lens unit 12 holds a third photographic lens group. A base member 13 includes an image sensor. In additional exemplary embodiments, the lens barrel 2 is not limited to the above configuration, as long as it satisfies the characteristics of the present exemplary embodiment.

Figure 3:
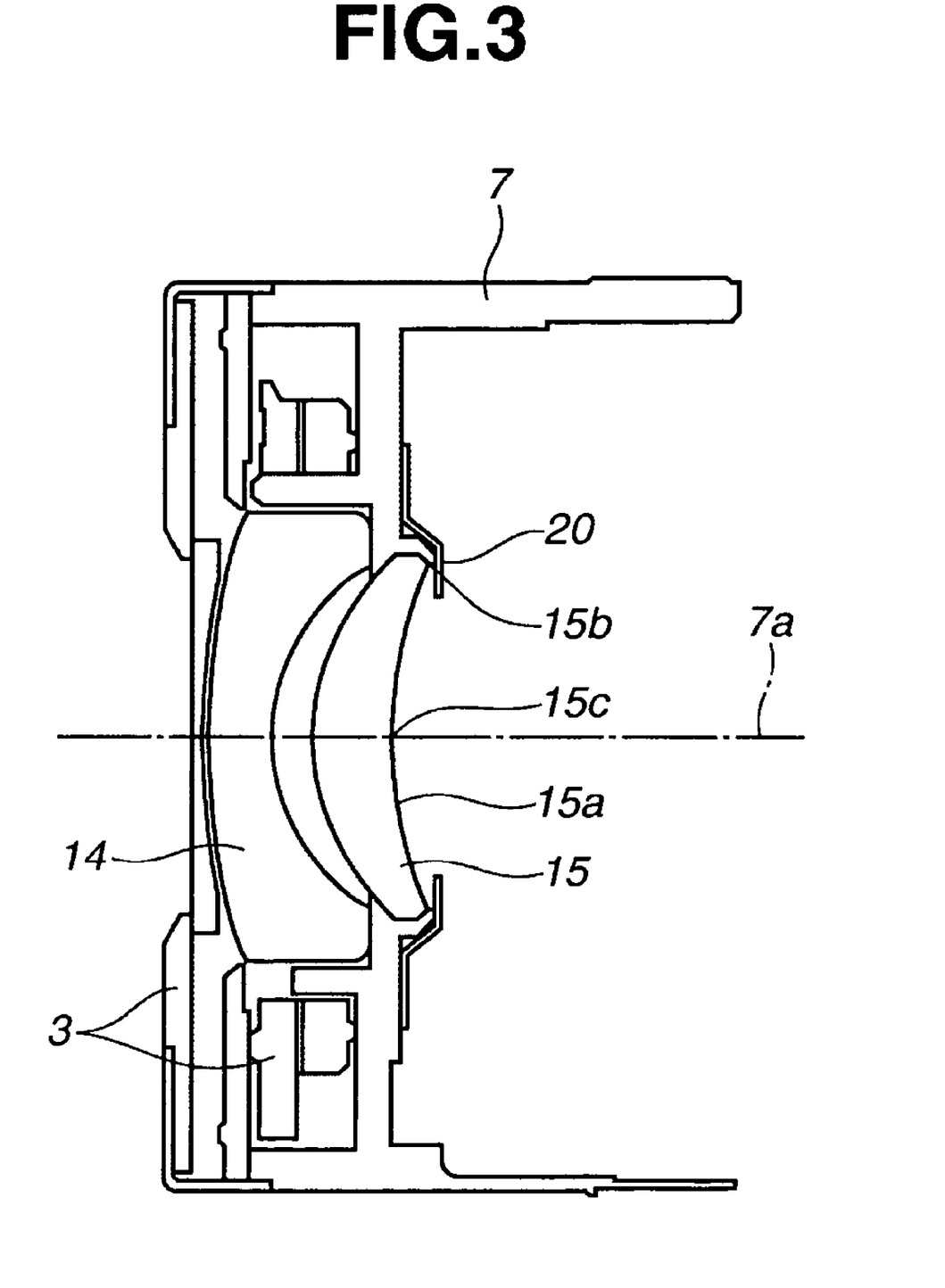
FIG. 3 illustrates a central cross-sectional view of a first lens unit along an optical axis direction according to at least one exemplary embodiment.

FIG. 3 illustrates a central cross-sectional view of the first lens unit 7 along the optical axis direction 7a. The first lens unit 7 includes a first lens 14 and a second lens 15. A surface 15a of the second lens 15 facing the image sensor can be a concave surface. The first lens unit 7 further includes a first lens unit diaphragm 20 fixed or operatively connected (e.g., attached to a separate adjustable holder) thereto for reducing the influence of unnecessary external light. The first lens unit diaphragm 20 has an optical path opening part located nearer to the optical axis 7a than an outer diameter part of the second lens 15.

Figure 4:
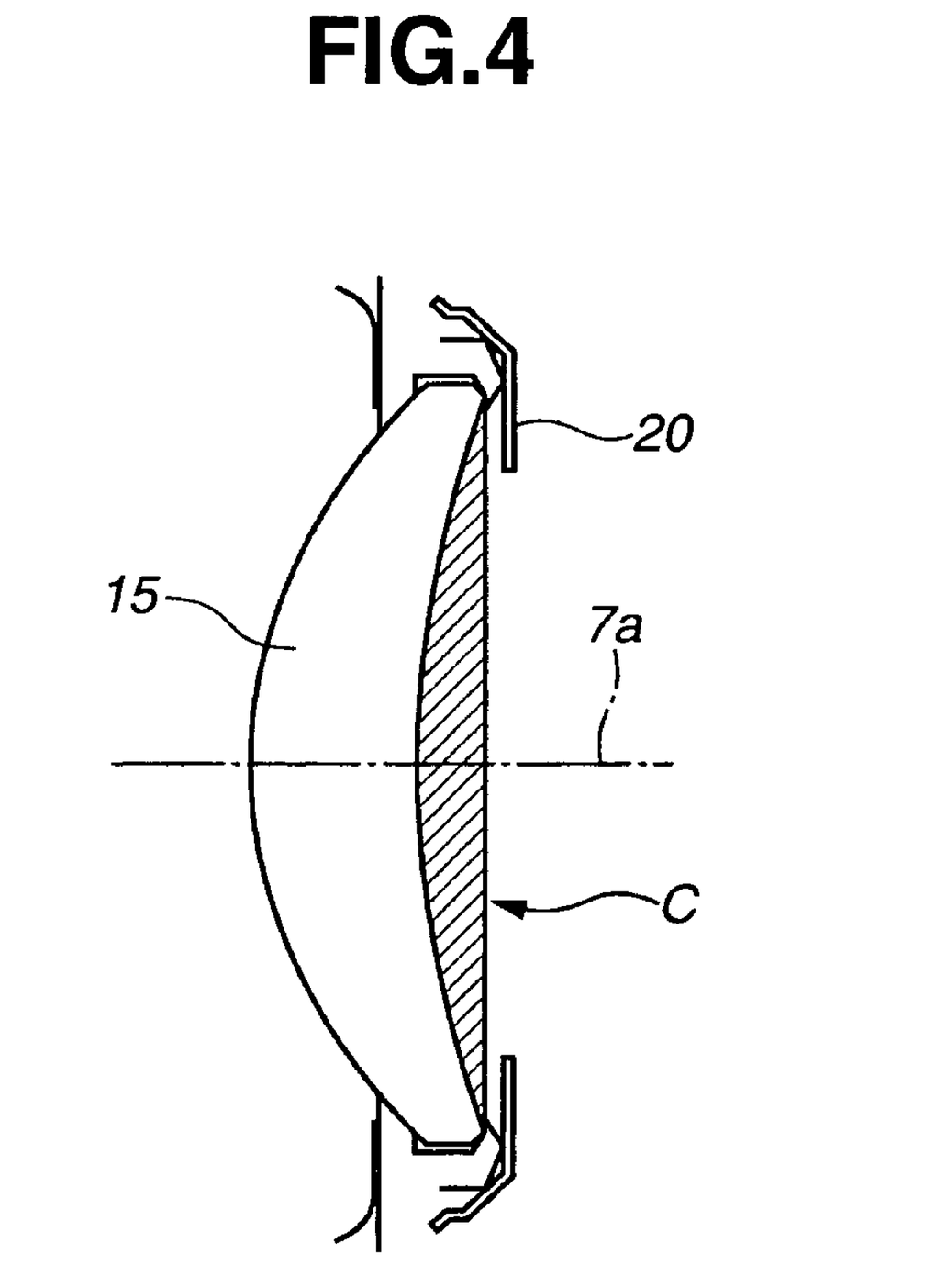
FIG. 4 illustrates an enlarged cross-sectional view of a space C in the first lens unit.

FIG. 4 illustrates an enlarged view illustrating a space C (a hatched part in FIG. 4), which is described below.

Figure 5:
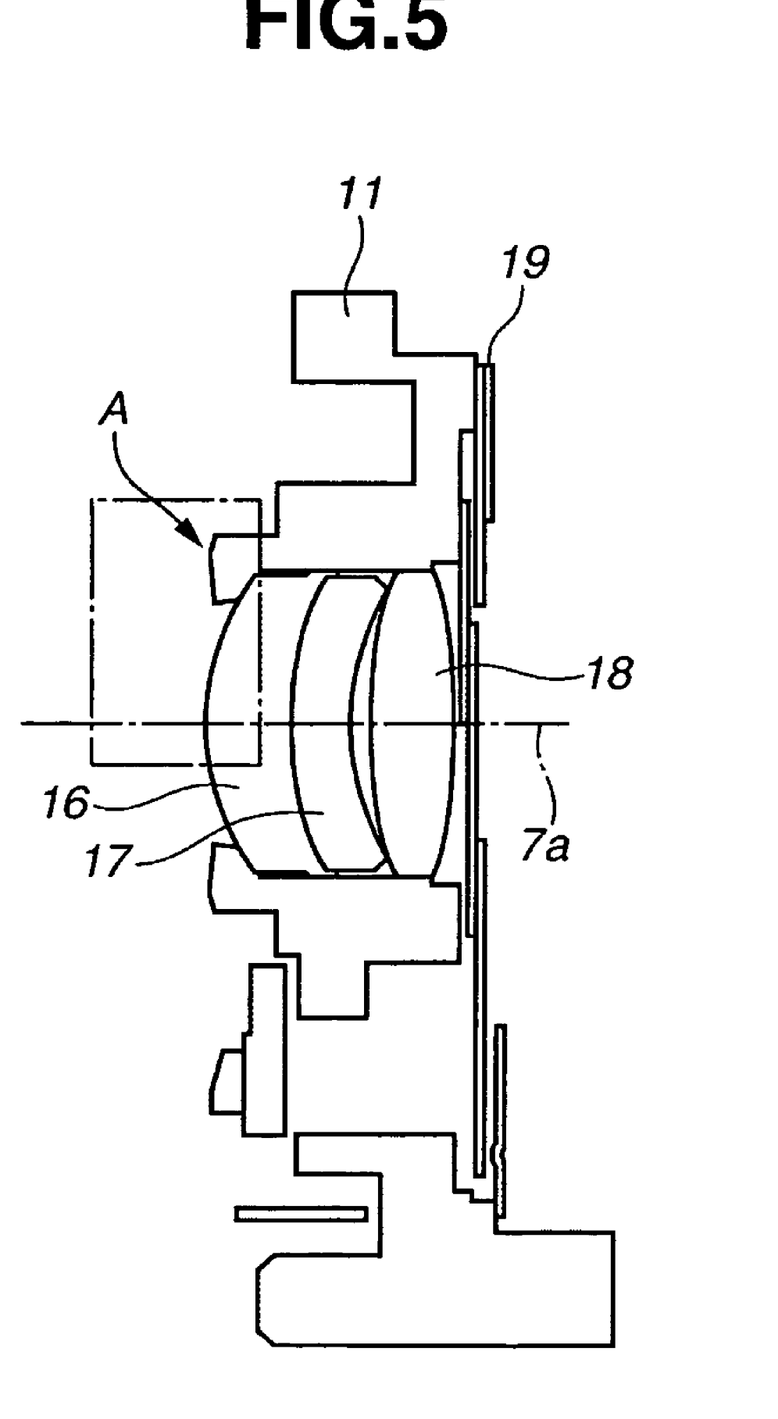
FIG. 5 illustrates a central cross-sectional view of a second lens unit along the optical axis direction according to at least one exemplary embodiment.
Figure 6:
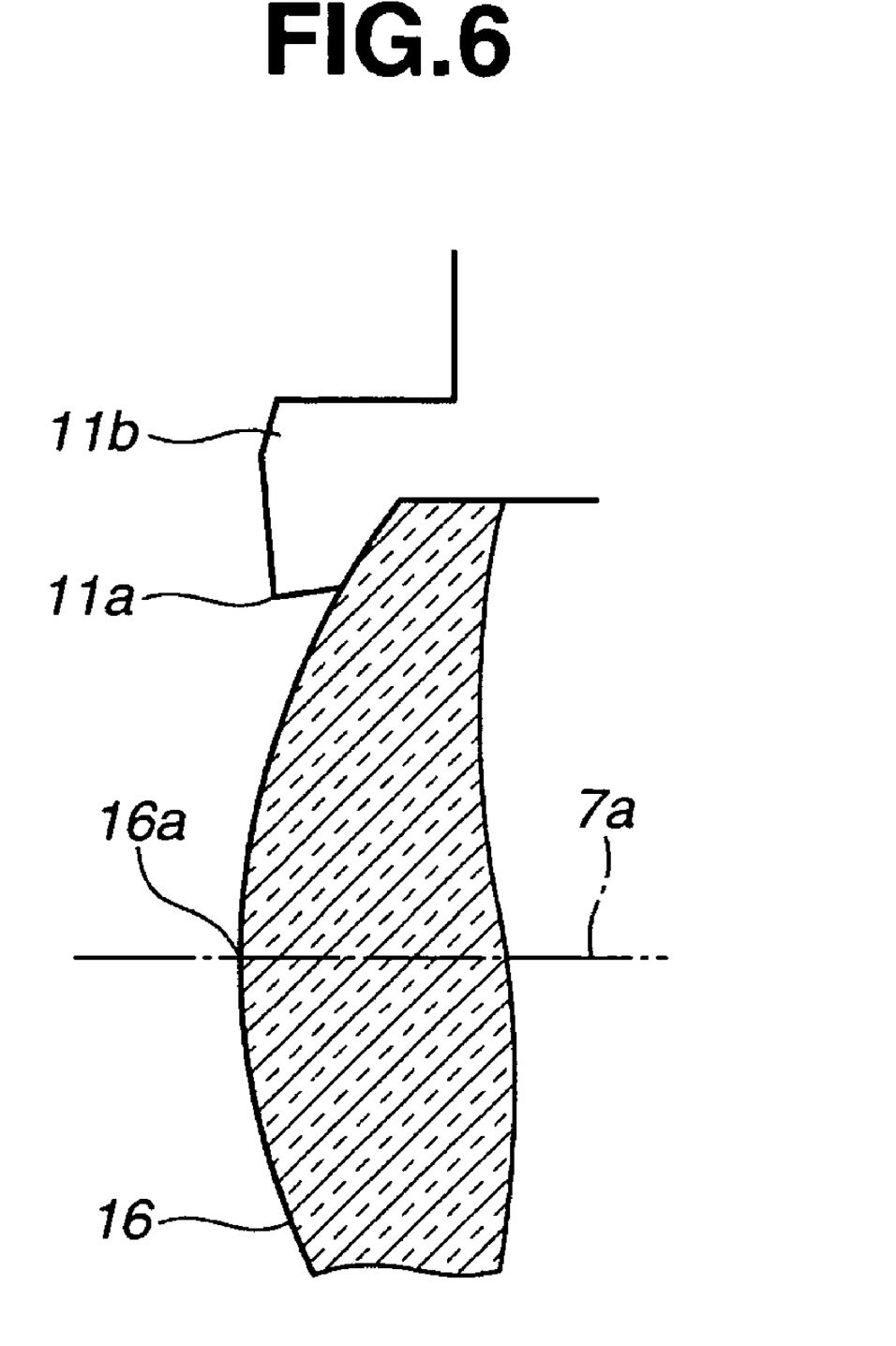
FIG. 6 illustrates an enlarged cross-sectional view of a part A in the second lens unit.

FIG. 5 illustrates a central cross-sectional view of the second lens unit 11 along the optical axis 7a direction. The second lens unit 11 includes a third lens 16, a fourth lens 17, a fifth lens 18, and a shutter unit 19. The shutter unit 19 can open and close a full aperture via a shutter actuator (not shown). FIG. 6 illustrates an enlarged cross-sectional view of a part A shown in FIG. 5 (an area surrounded with long and short dashed lines in FIG. 5).

A vertex 16a of the third lens 16 facing a photographic object side is located on the optical axis 7a. Further, a diaphragm shaped part 11a can be formed integrally with the second lens unit 11. The diaphragm shaped part 11a can be located nearer to the image sensor side than the vertex 16a of the third lens 16 along the optical axis. Furthermore, a lens holding shaped part 11b can be formed integrally with the second lens unit 11. The lens holding shaped part 11b can be located nearer to the image sensor side than the vertex 16a of the third lens 16 along the optical axis 7a, and can have a shape located nearer to the photographic object side than the second lens unit diaphragm shaped part 11a along the optical axis 7a.

With the above configuration, the positions of the third lens 16, the fourth lens 17, and the fifth lens 18, which constitute the second photographic lens group, can be matched with the diaphragm. The matching is facilitated by the diaphragm shaped part 11a being formed integrally with the second lens unit 11 holding a part of the photographic lens. If the center of the second photographic lens group deviates from that of the diaphragm, a desired image may not be captured with respect to a photographic image frame. A remarkably clear photograph can be taken when the position of the second lens unit 11, which is a part of the second photographic lens group, is matched with the position of the second lens unit diaphragm shaped part 11a, which is a part of the diaphragm, as described above.

Figure 7:
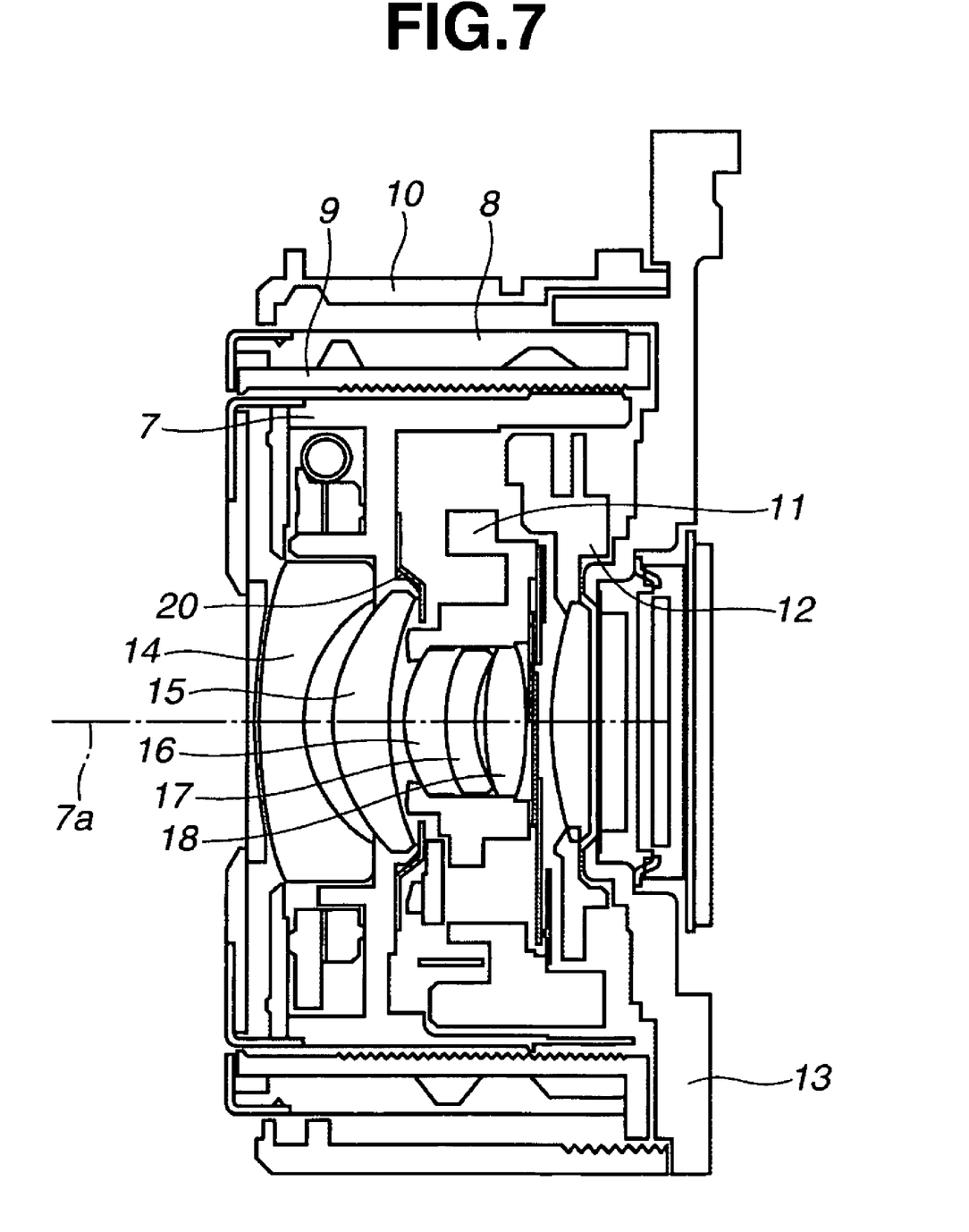
FIG. 7 illustrates a central cross-sectional view of the lens barrel along the optical axis direction when the lens barrel is in a retracted state.

FIG. 7 illustrates a cross-sectional view of the lens barrel 2 when the lens barrel is in a retracted state (e.g., when the power source of the camera is turned off). The first lens unit 7 and the second lens unit 11 are incorporated in the lens barrel as shown in FIG. 7.

As described above, the first lens unit 7 includes the first lens unit diaphragm 20. Further, the second lens unit 11 includes the lens holding shaped part 11b and the second lens unit diaphragm shaped part 11a facing the first lens unit 7.

Figure 8:
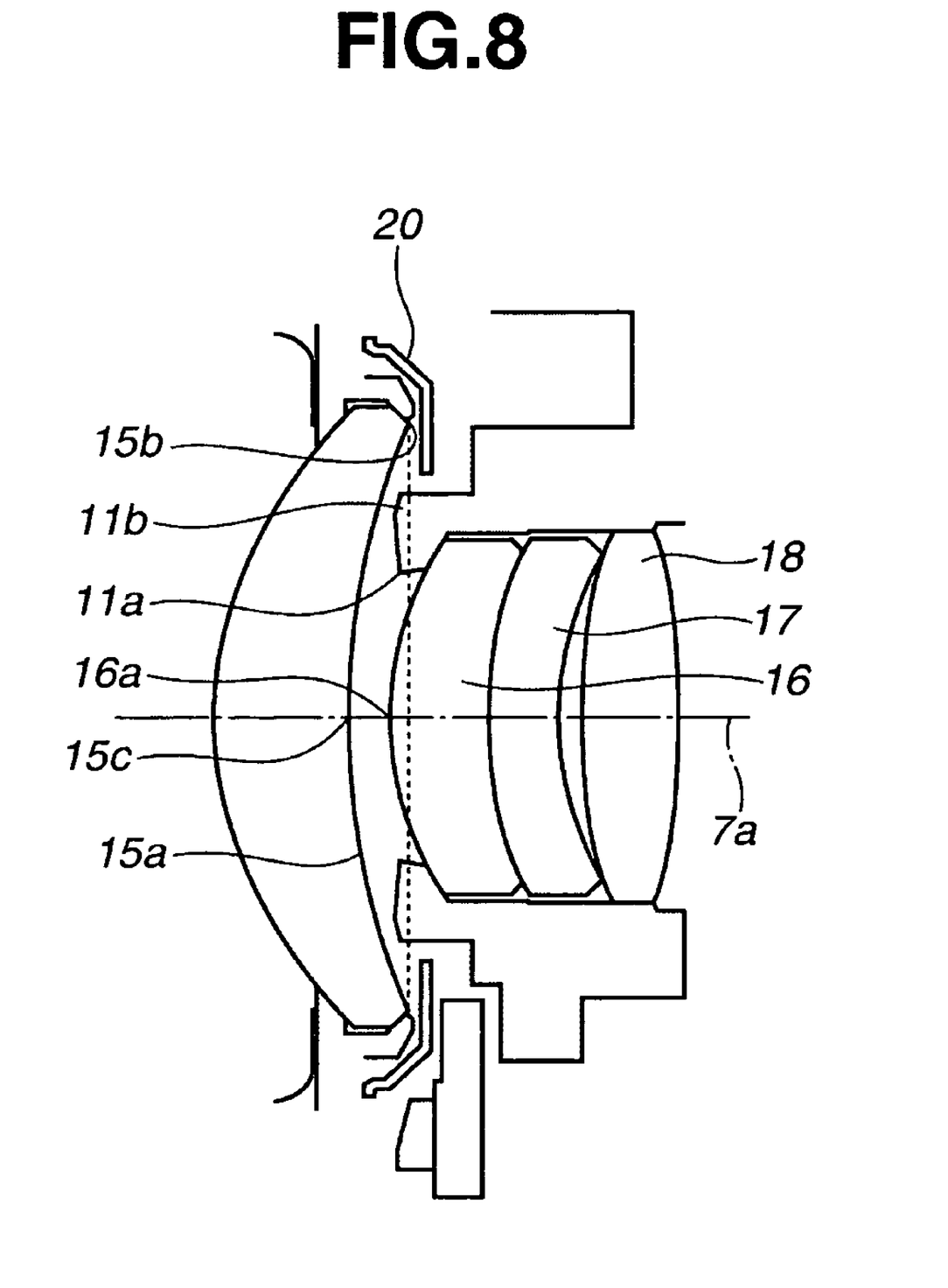
FIG. 8 illustrates an enlarged cross-sectional view of a part of the lens barrel illustrated in FIG. 7.

FIG. 8 illustrates an enlarged view of a part of FIG. 7. The arrangement of the first lens unit 7 and the second lens unit 11 illustrated in FIG. 8 is described below.

As illustrated in FIGS. 7 and 8, the lens holding shaped part 11b and the diaphragm shaped part 11a of the second lens unit 11 and the vertex 16a of the third lens 16 enter the inside of the space C (the hatched part in FIG. 4) when the lens barrel is in a retracted state. The space C includes an edge 15b located nearest to the image sensor side of the second lens 15 and a point 15c located on the optical axis 7a of the second lens 15, and is defined by the concave surface 15a of the second lens 15. Since the imaging plane side of the second lens 15 is the concave surface 15a, the axial distance between the second lens 15 and the third lens 16 can be shortened. Further, as a result of this, the axial distance between the first lens unit 7 and the second lens unit 11 can be shortened. As described above, there are fewer assembling errors and manufacturing errors, when the first lens unit 7 and second lens unit 11 are operatively integrated, as compared with a case where a lens holding shaped part and a diaphragm shaped part are formed as separate members. This is facilitated when the second lens unit holding shaped part 11b and the second lens unit diaphragm shaped part 11a are formed integrally with the second lens unit 11. Thus, the first lens unit 7 can be made as close as possible to the second lens unit 11.

In addition, in the above description, the second lens unit diaphragm shaped part 11a is located in the space C. However, the present embodiment is not limited to this configuration, and any configuration satisfying the characteristics of the present exemplary embodiment can be used. For example, the diaphragm can be located in the vicinity of a thermal caulking part holding a lens outside the space C.

According to the above configuration, the depth of the lens barrel can be reduced when the lens barrel is in a retracted state, and as a result of this, the thickness of the camera can also be reduced.

Furthermore, when the photographic focal length of the camera is changed (e.g., when the zoom operation is performed), the first lens unit 7 can be made as close as possible to the second lens unit 11 by setting the following configuration. The second lens unit holding shaped part 11b, the second lens unit diaphragm shaped part 11a, and the vertex 16a of the third lens 16 enter the space C, as in a case where the lens barrel is in a retracted state. Thus it can be facilitating the increase of the zoom magnification, and subsequently it can be enlarging a photographing area of a camera.

In at least one exemplary embodiment, a diaphragm shaped pattern can be printed on a photographic lens. Printing on photographic lenses can be subject to processing conditions. Further, if dust, or some other flaw is attached to a lens surface while the diaphragm is printed, the performance of the photographic lens can be degraded. Therefore, to reduce such an occurrence, the lens should be washed. Thus, the printing of a diaphragm shaped pattern on a photographic lens can result in an increase in part processing costs. Therefore, a technique that facilitates the reduction of the thickness of the camera while maintaining the performance of a diaphragm and preventing an unnecessary cost increase.

Thus, in accordance with at least one exemplary embodiment, as illustrated in FIG. 8, the first lens unit diaphragm 20 can be formed with a diaphragm part formed by a general pressing method. This processing method facilitates manufacturing parts at low cost as compared with the above method of printing on the lens.

In a case where the lens diameter of the first photographic lens group is larger than that of the second photographic lens as in the photographic lens according to the present exemplary embodiment, the diameter of a diaphragm of the first photographic lens group is also larger than that of a diaphragm of the second photographic lens group.

As described above, in the present exemplary embodiment, the second lens unit holding shaped part 11b, the second lens unit diaphragm shaped part 11a, and the third lens 16 enter the inner circumferential space of the first lens unit diaphragm 20 when the lens barrel is in a retracted state. In addition, the second lens unit diaphragm shaped part 11a can be located nearer to the photographic object side than the first lens unit diaphragm 20 along the optical axis direction.

As described above, in at least one exemplary embodiment, the second lens unit diaphragm shaped part 11a can be formed integrally with the second lens unit 11. Therefore, there are fewer assembling errors and manufacturing errors. Further, since the tolerances of parts is reduced as the assembling errors and manufacturing errors decrease, another diaphragm can be made close to the inner circumferential space of the first lens unit diaphragm 20. Accordingly, in at least one exemplary embodiment, the sizes of the diaphragm diameter and the outer diameter of the photographic lens can be increased. Thus, the degree of freedom of lens design can be increased and a lens having a large full aperture (full-aperture FNo) can be provided. Furthermore, since the second lens unit diaphragm shaped part 11a is formed integrally with the second lens unit holding shaped part 11b, both parts can be positioned with sufficient accuracy. As a result of this, a good performance lens barrel, that is, a camera capable of taking clearer images, can be provided.

Further, the second lens unit holding shaped part 11b, the second lens unit diaphragm shaped part 11a, and the third lens 16 enter the inner circumferential space of the first lens unit diaphragm 20. This configuration can be facilitated by forming the second lens unit diaphragm shaped part 11a integrally with the second lens unit 11. When the second lens unit diaphragm shaped part 11a is integrally formed in this way, the tolerances of parts becomes less and, thus, the second lens unit 11 can be made as close as possible to the first lens unit 7 within the space C shown in FIG. 4 and the inner circumferential space of the first lens unit diaphragm 20. Accordingly, the depth of the lens barrel can be reduced when the lens barrel is in a retracted state.

Furthermore, when the photographic focal length of the camera is changed (e.g., when the zoom operation is performed), the first lens unit 7 can be made as close as possible to the second lens unit 11. This is facilitated because the second lens unit holding shaped part 11*b*, the second lens unit diaphragm shaped part 11*a*, and the third lens 16 enter the inner circumferential space of the first lens unit diaphragm 20. Thus in at least one exemplary embodiment, the zoom magnification is increased and a photographing area enlarged.

In other words, since another diaphragm enters the inner circumferential space of the first lens unit diaphragm 20, not only can a photogenic lens barrel have an increased performance, but also the parts can be manufactured at lower cost. Furthermore, the depth of the lens barrel can be reduced when the lens barrel is in a retracted state. In addition, the present exemplary embodiment is not limited to the above configuration if the above characteristics of the exemplary embodiment are satisfied.

As described above, in at least one exemplary embodiment, a lens barrel includes a photographic lens including a plurality of lens units, where at least one lens surface of the photographic lens is a concave surface facing an imaging plane, and an optical diaphragm. The optical diaphragm is stowable in a space defined by the concave surface. In at least one further exemplary embodiment, in the lens barrel configured as described above, the optical diaphragm is formed integrally with a member holding the photographic lens. In at least one further exemplary embodiment, in the lens barrel configured as described above, the member holding the photographic lens is stowable in a space defined by the concave surface.

In at least one further exemplary embodiment, a lens barrel includes a photographic lens including a plurality of lens units, and a plurality of optical diaphragms corresponding to the plurality of lens units. At least one optical diaphragm is configured to enter an inner circumferential space of another optical diaphragm.

In at least one exemplary embodiment, in the lens barrel configured as described above, at least one of the plurality of optical diaphragms is formed integrally with a member holding the photographic lens.

In at least one further exemplary embodiment, a lens barrel includes a photographic lens including a plurality of lens units, at least one lens surface of the photographic lens being a concave surface facing an imaging plane, and an optical diaphragm. At least a part of a member holding the photographic lens is stowable in a space defined by the concave surface and the optical diaphragm.

A lens barrel in accordance with at least one exemplary embodiment is directed to a lens barrel with good performance with a reduced depth of the lens barrel when the lens barrel is in a retracted state. Further, the lens barrel can be configured to have an increased zoom magnification.

Additionally a lens barrel, in accordance with at least one exemplary embodiment, can have the length of the lens barrel, in the optical axis direction, reduced. Furthermore, the focal length can be changed at an increased magnification ratio.

Further, the optical diaphragm and the photographic lens can be positioned with sufficient accuracy, and, thus, a camera capable of taking a clearer image can be provided. Further, a lens barrel having low assembling errors and manufacturing errors can be provided.

In at least one exemplary embodiment the first lens unit can be made as close as possible to the second lens unit, and, thus, the depth of the lens barrel can be reduced when the lens barrel is in a retracted state. Further, the focal length can be changed at an increased magnification ratio.

In addition, the configuration between the first lens unit and the second lens unit is explained above. However, the present invention is not limited to the discussed configurations of the exemplary embodiment, for example a similar configuration, as between the first and second lens units, may be applied to the configuration between the second lens unit and the third lens unit.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions. For example, if words such as "orthogonal", "perpendicular" are used the intended meaning is "substantially orthogonal" and "substantially perpendicular" respectively. Additionally although specific numbers may be quoted in the claims, it is intended that a number close to the one stated is also within the intended scope, i.e. any stated number (e.g., 90 degrees) should be interpreted to be "about" the value of the stated number (e.g., about 90 degrees).

What is claimed is:

1. A lens barrel comprising:
    a photographic lens including a plurality of lens units, at least one lens surface of the photographic lens being a concave surface; and
    an optical diaphragm,
    wherein the optical diaphragm is configured to enter a space defined by the concave surface at a position when the lens barrel is in a retracted state within a camera body because the power source of the camera is turned off.

2. The lens barrel according to claim 1, wherein the optical diaphragm is formed integrally with a member holding the photographic lens.

3. The lens barrel according to claim 2, wherein the member holding the photographic lens is at least partly stowable in a space defined by the concave surface.

4. A lens barrel comprising:
    a photographic lens including a plurality of lens units; and
    a plurality of optical diaphragms corresponding to the plurality of lens units,
    wherein at least one diaphragm is configured to enter an inner circumference space of another optical diaphragm at a position when the lens barrel is in a retracted state within a camera body because the power source of the camera is turned off.

5. The lens barrel according to claim 4, wherein at least one of the plurality of optical diaphragms is formed integrally with a member holding the photographic lens.

6. A lens barrel comprising:
    a photographic lens including a plurality of lens units, at least one lens surface of the photographic lens being a concave surface; and
    an optical diaphragm,
    wherein at least a part of a member holding one of the plurality of lens units is stowable in a space defined by the concave surface and the optical diaphragm when the lens barrel is in a retracted state within a camera body because the power source of the camera is turned off.

7. An imaging apparatus comprising:
    the lens barrel according to claim 1; and
    an imaging unit configured to receive light from an object via the lens barrel and to output a signal corresponding the received light.

8. An imaging apparatus comprising:
the lens barrel according to claim 4; and
an imaging unit configured to receive light from an object via the lens barrel and to output a signal corresponding the received light.

9. An imaging apparatus comprising:
the lens barrel according to claim 6; and
an imaging unit configured to receive light from an object via the lens barrel and to output a signal corresponding the received light.

10. The lens barrel according to claim 2, wherein the photographic lens includes a first, second, and third lens units, wherein the member holds the second lens unit, and where the diaphragm is a shaped part in the member.

11. The lens barrel according to claim 10, wherein the third lens has a vertex, and wherein the vertex and the shaped part enter the space, increasing the zoom magnification capacity of the lens barrel, and subsequently enlarging a photographing area of the lens barrel.

* * * * *